(12) United States Patent
Aoyama et al.

(10) Patent No.: US 8,068,398 B2
(45) Date of Patent: Nov. 29, 2011

(54) RECORDING METHOD FOR OPTICAL RECORDING MEDIUM AND RECORDING APPARATUS

(75) Inventors: Tsutomu Aoyama, Tokyo (JP); Tatsuya Kato, Tokyo (JP)

(73) Assignee: TDK Corporation, Tokyo (JP)

( * ) Notice: Subject to any disclaimer, the term of this patent is extended or adjusted under 35 U.S.C. 154(b) by 839 days.

(21) Appl. No.: 11/880,580

(22) Filed: Jul. 23, 2007

(65) Prior Publication Data

US 2008/0025181 A1 Jan. 31, 2008

(30) Foreign Application Priority Data

Jul. 26, 2006 (JP) .................................. 2006-203108

(51) Int. Cl.
*G11B 7/00* (2006.01)
(52) U.S. Cl. .................................................. 369/59.11
(58) Field of Classification Search ................ 369/59.11, 369/59.12, 116
See application file for complete search history.

(56) References Cited

U.S. PATENT DOCUMENTS

| | | | |
|---|---|---|---|
| 5,109,373 A | 4/1992 | Ohno et al. | |
| 5,412,626 A | 5/1995 | Ohno et al. | |
| 5,732,062 A * | 3/1998 | Yokoi et al. ................... | 369/116 |
| 5,825,742 A * | 10/1998 | Tanaka et al. ............... | 369/59.11 |
| 6,125,085 A * | 9/2000 | Fuji et al. ...................... | 369/116 |
| 6,813,232 B1 * | 11/2004 | Sunagawa et al. ........... | 369/53.2 |
| 7,050,367 B1 * | 5/2006 | Negishi et al. ................ | 369/116 |
| 7,139,230 B2 * | 11/2006 | Shirota et al. ............... | 369/59.11 |
| 7,242,657 B2 * | 7/2007 | Ito et al. ...................... | 369/59.11 |
| 7,272,095 B2 * | 9/2007 | Shoji et al. .................. | 369/59.12 |
| 7,532,554 B2 * | 5/2009 | Kobayashi et al. ......... | 369/59.11 |
| 7,643,387 B2 * | 1/2010 | Kim et al. ................... | 369/44.26 |
| 2001/0012253 A1 | 8/2001 | Ohno | |
| 2003/0067857 A1 | 4/2003 | Shirota et al. | |
| 2004/0136307 A1 | 7/2004 | Ito et al. | |
| 2004/0145985 A1 | 7/2004 | Osakabe | |
| 2005/0030870 A1 * | 2/2005 | Rijpers et al. .............. | 369/59.11 |
| 2005/0036423 A1 * | 2/2005 | Ichimura et al. ........... | 369/59.11 |
| 2005/0063273 A1 | 3/2005 | Shingai et al. | |
| 2005/0063274 A1 * | 3/2005 | Nagano et al. .............. | 369/59.11 |
| 2005/0094526 A1 * | 5/2005 | Kakiuchi et al. ........... | 369/59.11 |
| 2005/0099924 A1 * | 5/2005 | Dekker et al. .............. | 369/59.11 |
| 2005/0105438 A1 | 5/2005 | Hibino et al. | |
| 2005/0147007 A1 | 7/2005 | Nakano et al. | |
| 2005/0147012 A1 * | 7/2005 | Hwang et al. ............... | 369/59.12 |
| 2005/0207308 A1 * | 9/2005 | Kobayashi et al. ......... | 369/59.11 |
| 2005/0243677 A1 | 11/2005 | Kobayashi et al. | |
| 2006/0209657 A1 * | 9/2006 | Tieke et al. ................. | 369/59.11 |
| 2006/0250917 A1 * | 11/2006 | Tieke et al. ................. | 369/59.11 |

(Continued)

FOREIGN PATENT DOCUMENTS

EP 1182649 A1 2/2002

(Continued)

*Primary Examiner* — Thang Tran
(74) *Attorney, Agent, or Firm* — Porzio, Bromberg & Newman, P.C.

(57) ABSTRACT

A recording method suitable for high-density recording is provided. When information is recorded on an optical recording medium with irradiation of a write pulse of a laser beam, a length corresponding to 7 T is set to be equal to or less than the spot diameter $\lambda/NA$ of the laser beam where T is one recording clock cycle, $\lambda$ is a wavelength of the laser beam, and NA is a numerical aperture of the objective lens, and a specified mark with a length corresponding to 3 T or more is recorded by a single write pulse.

13 Claims, 15 Drawing Sheets

U.S. PATENT DOCUMENTS

2007/0237060 A1 * 10/2007 Ohno et al. ................ 369/275.1

FOREIGN PATENT DOCUMENTS

| | | |
|---|---|---|
| JP | 612674 A | 1/1994 |
| JP | 2707774 | 10/1997 |
| JP | 2001-273638 | 5/2001 |
| JP | 2001331936 A | 11/2001 |
| JP | 2002-288830 | 4/2002 |
| JP | 200385753 A | 3/2003 |
| JP | 2004111020 A | 4/2004 |
| JP | 2004146040 A | 5/2004 |
| JP | 2004213743 A | 7/2004 |
| JP | 2005-63586 | 3/2005 |
| JP | 2005-71516 | 3/2005 |
| JP | 2005228383 A | 8/2005 |
| JP | 2006172667 A | 6/2006 |

* cited by examiner

Fig. 2
(A)
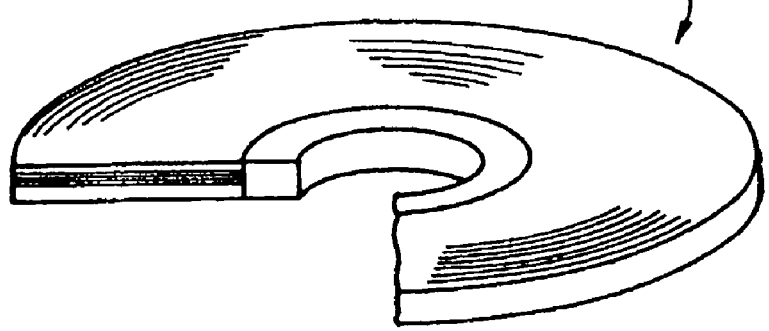
(B)
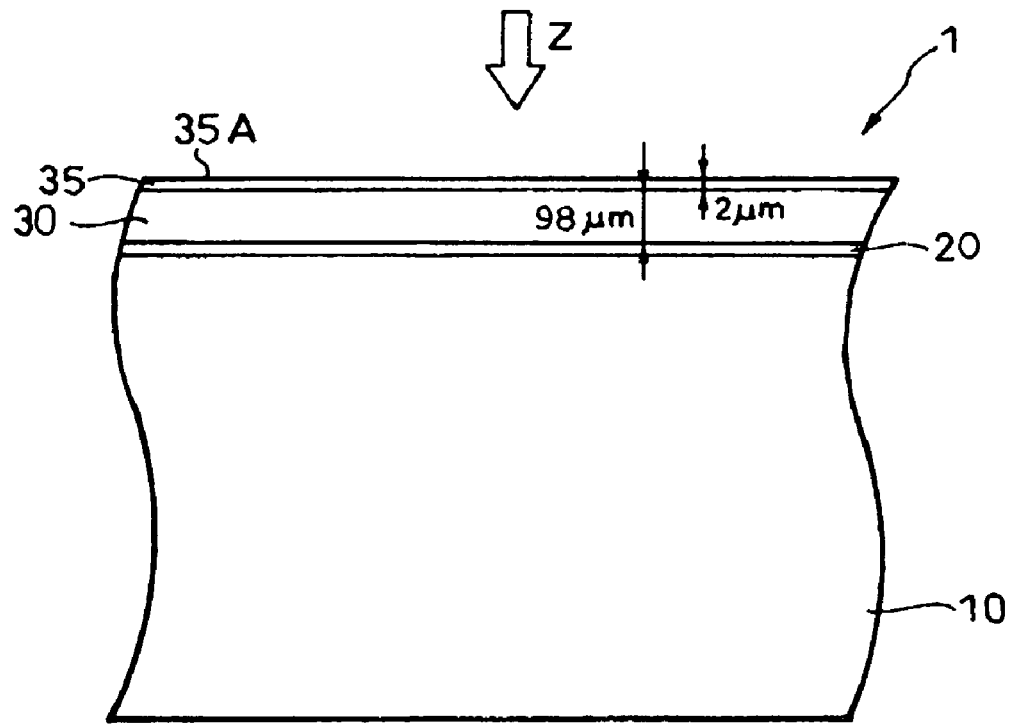

Fig.13
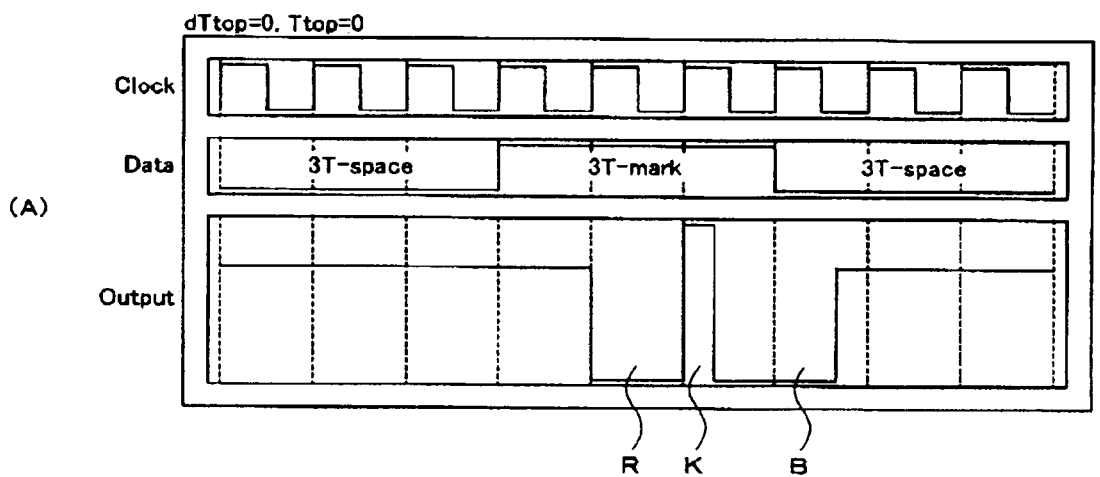
(A)
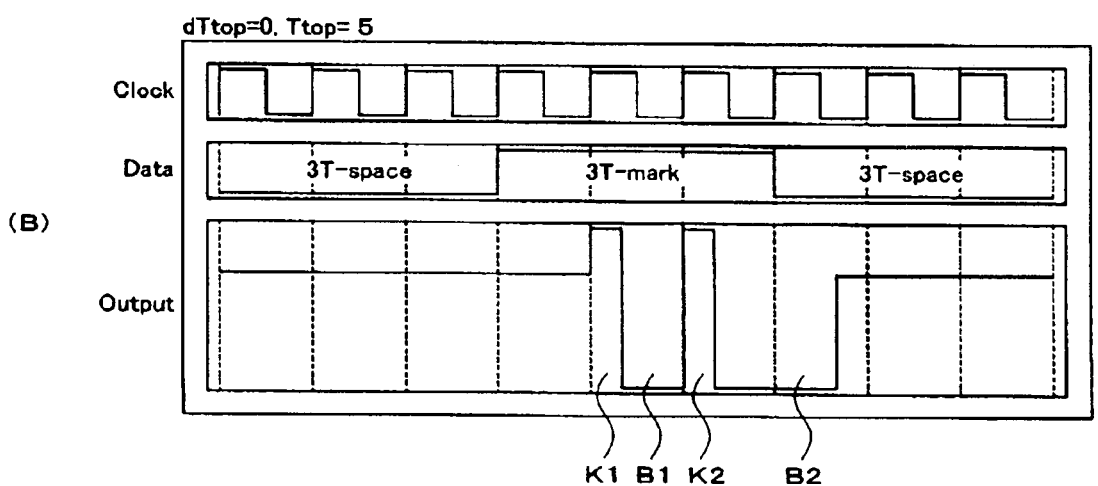
(B)

Fig.14

< Storage capacity 30GB >

| Evaluation method | Example 1 | Comparative Example 1 |
|---|---|---|
| PRSNR | 16.8 | 15.8 (Start write-pulse width 5nsec) |
| SbER | 5.5E-07 | 3.4E-06 (Start write-pulse width 5nsec) |

Fig. 15

| Evaluation method | Comparative example 1<br>Write strategy for Example 1 | Comparative example 2 < Storage capacity 25GB ><br>Write strategy for Comparative Example 1 |
|---|---|---|
| PRSNR | 22.3 | 23.0 (Start write-pulse width 5nsec) |
| SbER | 3.9E-08 | 4.6E-08 (Start write-pulse width 5nsec) |

RECORDING METHOD FOR OPTICAL RECORDING MEDIUM AND RECORDING APPARATUS

BACKGROUND OF THE INVENTION

1. Field of the Invention

The present invention relates to a method and apparatus for recording information on an optical recording medium, and in particular, to a method for irradiation the optical recording medium with a laser beam using pulse control during recording.

2. Description of the Related Art

Various standards of optical recording media such as CD-R/RWs and DVD-R/RWs, which allow the user to record information, have been widely used. Meanwhile, the demand for large storage capacity in these types of optical recording media is increasing year by year. In order to meet this demand, new standards such as Blu-ray discs (BDs) have been proposed. In the Blu-ray Disc standard, an optical disc apparatus uses a data recording/reproduction laser beam with a narrow beam spot diameter. Specifically, the apparatus uses a laser beam with a shorter wavelength $\lambda$ and a higher numerical aperture (NA) objective lens for condensing the laser beam. As a result, an information recording layer of the Blu-ray disc can store as much data as 25 GB or greater.

In general, rewritable optical recording media, which allow rewriting data, use a recording film made of a phase change material. Specifically, heating the recording film by irradiation with a laser beam and appropriately controlling the cooling rate thereafter can selectively form an amorphous region and a crystal region in the film, and the difference in reflectivity between these regions achieves recording information. When doing so, the laser beam is required to be set under various conditions such as a write power level (Pw) with a high energy, an erase power level (Pe) with a middle energy, and a bias power level (Pb) with a low energy. Recording information on the optical recording medium is performed by pulse irradiation of the laser beam with any selected one of the three power levels.

In order to form a mark on an optical recording medium, a write pulse at the write power level and a bias pulse at the bias power level are alternately irradiated. The recording film is irradiated with the write pulse, so that the irradiated region is heated to its melting point or more. When the same region is then irradiated with the bias pulse, the area is rapidly cooled and thus is turned to an amorphous recording mark. Therefore, if the set of the write pulse and the bias pulse is continuously applied, it is possible to form a long recording mark.

Irradiating the optical recording medium with a laser beam with the erase power level erases a mark having been recorded on the optical recording medium. The recording film is irradiated with the laser beam with the erase level, so that the irradiated region is heated to its crystallization temperature or more. The whole irradiated region, including the amorphous region (mark), is then crystallized by natural cooling, so that the recording mark is erased.

Accordingly, recording information is performed in such a manner that a region where a mark is to be formed is continuously irradiated alternately with the write pulse and the bias pulse according to the length of the mark, and a region where a space is to be formed is irradiated with a laser beam with the erase power level according to the length of the space. Such a power modulation method is called a write strategy.

Increasing the recording density as well as the write speed causes an edge shift on the recording mark. For example, when a long recording mark such as 4 T or 6 T is formed by a plurality of write pulses, too high write speed makes it hard to ensure sufficient cooling time, which corresponds to the width of the bias pulse between the write pulses. This poor cooling causes a part of the mark to recrystallize, and thus may degrade the recording quality. Therefore, in order to increase the recording accuracy, accurate control of the laser pulse is required, and therefore, there are various approaches.

For example, Japanese Patent Application Laid-Open No. 2005-71516 discloses that, when writing each mark, the width of a bias pulse which is inserted into the end of the mark is varied depending on the length of the mark so as to reduce the jitter of a production signal. Moreover, when writing each mark, a bias pulse is inserted additionally into the top of the mark so as to delay the rising of the first write pulse. Similarly, Japanese Patent Application Laid-Open Nos. 2005-63586 and 2002-288830 disclose that at the beginning of writing a mark, a pulse with a power level lower than that of an erase pulse is inserted so as to prevent the top area of the mark from recrystallizing.

Japanese Patent Application Laid-Open No. 2001-273638 discloses that, when forming a mark with a 4 T length or more, a bias pulse is inserted so as to prevent the mark from recrystallizing. The publication of Japanese Patent No. 2707774 discloses that, when forming a long mark by, for example, three write pulses or more, a bias pulse is inserted either before a top write pulse or after an end write pulse so as to sharpen the leading or trailing edge of the mark.

However, a further increase in storage capacity increases the recording density of the information recording layer, thereby degrading the quality of the reproduction signal. This makes it hard to identify a bit using zero-crossing detection. At the same time, this makes it hard to determine the signal quality using the jitter. Therefore, a Partial Response, Maximum Likelihood (PRML) detection scheme may be used for signal reproduction. However, if the PRML detection scheme is adopted, then errors associated with marks corresponding to 2 T or 3 T are likely to increase. In other words, errors are likely to occur when the recording pattern is made of a series of relatively short marks. All the patent documents mentioned above are to perform a precise pulse control of all marks or relatively long marks. Therefore, the application of such a control without any modification is unable to fully perform high density recording.

Moreover, when high-speed recording is to be conducted on a large capacity (high density) medium exceeding 30 GB, it is necessary that the recording film be made of a material whose crystallization speed is extremely fast. However, if low-speed recording is conducted on such an optical recording medium, the recording accuracy will significantly deteriorate.

SUMMARY OF THE INVENTION

The present invention was developed in view of the above-mentioned problems, and it is an object of the present invention to provide a pulse control method that is suited for high density recording and to enhance recording accuracy.

To achieve the aforementioned object, a first aspect of the present invention is an optical information recording method for recording information on an optical recording medium by irradiation of a write pulse of a laser beam, the method including: setting a length corresponding to 7 T to be equal to or less than a spot diameter $\lambda/NA$ of the laser beam where T is one recording clock cycle, $\lambda$ is a wavelength of the laser beam, and NA is a numerical aperture of an objective lens; and recording a specified mark of a length corresponding to 3 T or greater by a single write pulse.

To achieve the aforementioned object, a second aspect of the present invention is the optical information recording method according to the aforementioned aspect, wherein the specified mark has a length corresponding to 3 T or 4 T.

To achieve the aforementioned object, a third aspect of the present invention is the optical information recording method according to the aforementioned aspects, wherein the specified mark is recorded by a single write pulse when a space immediately before the specified mark has a specified length, and the specified mark is recorded by a plurality of write pulses when the space immediately before the specified mark has a length other than the specified length.

To achieve the aforementioned object, a fourth aspect of the present invention is the optical information recording method according to the aforementioned aspects, wherein the specified length of the space immediately before the specified mark includes a minimum length.

To achieve the aforementioned object, a fifth aspect of the present invention is an optical information recording method for recording information on an optical recording medium by irradiation of a write pulse of a laser beam, the method including: setting a length corresponding to 7 T to be equal to or less than a spot diameter $\lambda/NA$ of the laser beam where T is one recording clock cycle, $\lambda$ is a wavelength of the laser beam, and NA is a numerical aperture of an objective lens; and, when recording an nT mark with a length corresponding to nT (n is a natural number), recording a mark with a length corresponding to 3 T or less by a single write pulse, recording a mark with a length corresponding to 4 T by one, two, or three write pulses, and recording a mark with a length corresponding to 5 T or greater by write pulses according to an n−1 write strategy.

To achieve the aforementioned object, a sixth aspect of the present invention is an optical information recording method for recording information on an optical recording medium by irradiation of a write pulse of a laser beam, the method including: setting a length corresponding to 7 T to be equal to or less than a spot diameter $\lambda/NA$ of the laser beam where T is one recording clock cycle, $\lambda$ is a wavelength of the laser beam, and NA is a numerical aperture of an objective lens; and, when recording an nT mark with a length corresponding to nT (n is a natural number), recording a mark with a length corresponding to 4 T or less by a single write pulse, and recording a mark with a length corresponding to 5 T or greater by write pulses according to an n/2 write strategy.

To achieve the aforementioned object, a seventh aspect of the present invention is the optical information recording method according to the aforementioned aspects, wherein the information recorded on the optical recording medium is erased by irradiation of the laser beam with an erase power level lower than that of the write pulse, and wherein a cooling pulse with a power level lower than the erase power level is inserted immediately before the write pulse that initiates the formation of the mark.

To achieve the aforementioned object, a eighth aspect of the present invention is an optical information recording method for recording information on an optical recording medium by irradiation of a write pulse of a laser beam and for erasing information recorded on the optical recording medium by irradiation of the laser beam with an erase power level lower than that of the write pulse, the method including: setting a length corresponding to 7 T to be equal to or less than a spot diameter $\lambda/NA$ of the laser beam where T is one recording clock cycle, $\lambda$ is a wavelength of the laser beam, and NA is a numerical aperture of an objective lens; and inserting a cooling pulse, with a power level lower than the erase power level, immediately before the write pulse that initiates the formation of the mark.

To achieve the aforementioned object, a ninth aspect of the present invention is the optical information recording method according to the aforementioned aspects, wherein the wavelength $\lambda$ of the laser beam is set to a value between 400 to 410 nm, and the numeral aperture NA is set to a value between 0.7 to 0.9.

To achieve the aforementioned object, a tenth aspect of the present invention is the optical information recording method according to the aforementioned aspects, wherein a shortest mark of all the marks is 125 nm or less.

To achieve the aforementioned object, a eleventh aspect of the present invention is an optical recording apparatus, including: a laser beam source for generating a laser beam; an objective lens for condensing the laser beam; and irradiation controller for irradiating an optical recording medium with a write pulse of the laser beam to record information, wherein the apparatus is configured such that a length corresponding to 7 T is equal to or less than a spot diameter $\lambda/NA$ of the laser beam where T is one recording clock cycle, $\lambda$ is a wavelength of the laser beam, and NA is a numerical aperture of the objective lens, and the irradiation controller irradiates a single write pulse onto the optical recording medium to form a specified mark of a length corresponding to 3 T or more.

To achieve the aforementioned object, a twelfth aspect of the present invention is an optical recording apparatus, including: a laser beam source for generating a laser beam; an objective lens for condensing the laser beam; and irradiation controller for irradiating an optical recording medium with a write pulse of the laser beam to record information and erasing information recorded on the optical recording medium by irradiation of the laser beam with an erase power level lower than that of the write pulse, wherein the apparatus is configured such that a length corresponding to 7 T is equal to or less than a spot diameter $\lambda/NA$ of the laser beam where T is one recording clock cycle, $\lambda$ is a wavelength of the laser beam, and NA is a numerical aperture of the objective lens, and the irradiation controller inserts a cooling pulse, with a power level lower than the erase power level, immediately before the write pulse that initiates the formation of the mark.

The present invention has the superior advantage of being capable of increasing the recording accuracy of high-density recording on an optical recording medium.

BRIEF DESCRIPTION OF THE DRAWINGS

FIG. 2A is a perspective view showing the structure of the optical recording medium, and FIG. 2B is an enlarged cross-sectional view showing the structure of the optical recording medium;

FIGS. 13A and 13B are timing charts showing pulse waveforms of Example 1 and Comparative Example 1, respectively;

FIG. 14 is a table showing evaluation results of recording quality of Example 1 and Comparative example 1; and FIG. 15 is a table showing evaluation results of recording quality of Comparative example 2.

DETAILED DESCRIPTION OF THE PREFERRED EMBODIMENTS

Embodiments of the present invention will be described in detail below with reference to the accompanying drawings.

Figure 1:
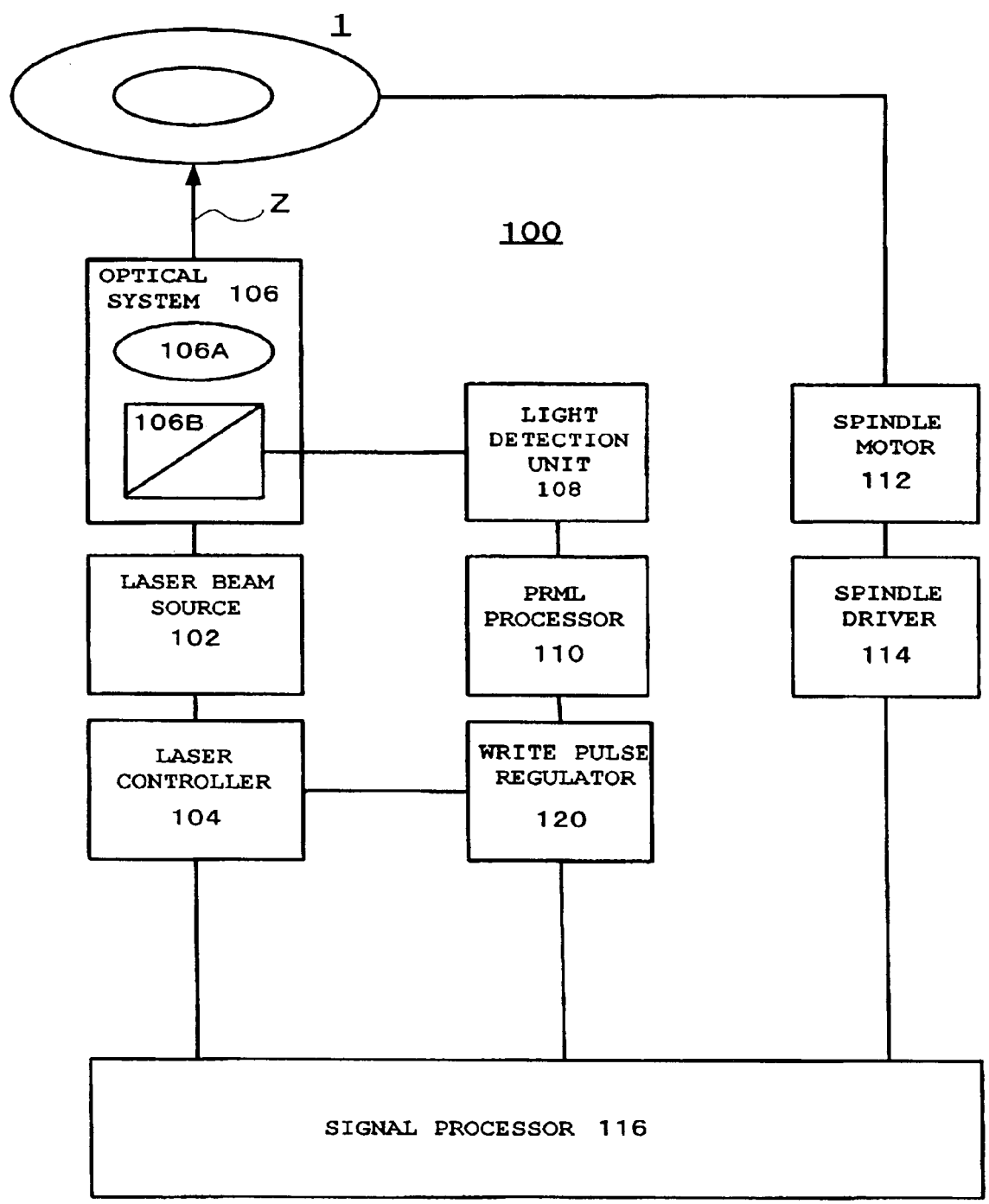
FIG. 1 is a block diagram of a recording reproduction apparatus for an optical recording medium according to a first embodiment of the present invention.

FIG. 1 shows a recording reproduction apparatus 100 which realizes an optical recording method according to a first embodiment of the present invention. The recording reproduction apparatus 100 includes a laser beam source 102 which generates a laser beam Z used for recording and reproduction, a laser controller (irradiation controller) 104 which controls the laser beam source 102, an optical system 106 which guides the laser beam Z to an optical recording medium 1, a light detection unit 108 which detects reflected light of the laser beam z during reproduction, a PRML processor 110 which decodes detection information of the light detection unit 108 in the PRML detection scheme, a spindle motor 112 which rotates the optical recording medium 1, a spindle driver 114 which controls the rotation of the spindle motor 112, a signal processor 116 which exchanges decoded reproduction data with a central processing unit (CPU) not shown in the drawing, and a write pulse regulator 120 which initializes a write pulse waveform of the laser controller 104.

The laser beam source 102, which is a semiconductor laser, is controlled by the laser controller 104 to generate the laser beam z. The optical system 106 includes an objective lens 106A and a polarizing beam splitter 106B, and can focus the laser beam Z onto an information recording layer accordingly. The polarizing beam splitter 106B picks up the reflected light from the information recording layer to guide it to the light detection unit 108. The light detection unit 108, which is a photodetector, receives the reflected light of the laser beam Z to convert it into an electric signal, and transmits it as a reproduction signal to the PRML processor 110. The PRML processor 110 decodes the reproduction signal, and transmits the decoded binary digital signal as reproduction data to the signal processor 116.

The recording reproduction apparatus 100 is also set to have a wavelength λ of the laser beam Z of 400 to 410 nm, and an initial read power of the laser beam Z of 0.35 mW. The objective lens 106A in the optical system 106 is also set to have a numerical aperture NA of 0.7 to 0.9. Accordingly, the spot diameter (λ/NA) of the laser beam Z is 444 nm to 585 nm.

The reproduction of the information recorded on the optical recording medium 1 is started in such a manner that the laser beam Z is generated from the laser beam source 102 so as to have a read power level, and then irradiates the information recording layer of the optical recording medium 1. The laser beam Z is then reflected from the information recording layer, and picked up by the light detection unit 108 through the optical system 106 to turn to an electric signal. This electric signal is converted into a digital signal through the PRML processor 110 and the signal processor 116, and transmitted to the CPU.

The optical recording medium 1 used for reproduction in the recording reproduction apparatus 100 will be described below. As shown in FIG. 2A, the optical recording medium 1 is a disc-shaped medium which has an outer diameter of approximately 120 mm and a thickness of approximately 1.2 mm. As shown in an enlarged view of FIG. 2B, the optical recording medium 1 is composed of a substrate 10, an information recording layer 20, a cover layer 30, and a hard coating layer 35, which are stacked in this order.

The cover layer 30 and the hard coating layer 35 are transmissive to the laser beam Z incident from the outside. Accordingly, the laser beam Z incident from a light incident surface 35A passes through the hard coating layer 35 and the cover layer 30 in this order into the information recording layer 20, to record and reproduce information on and from the information recording layer 20.

The substrate 10, which is a disk-shaped member with a thickness of approximately 1.1 mm, is made of any materials including, but not limited to, glass, ceramics, and resin, specifically to polycarbonate resin as described herein. Examples of the resin may include not only polycarbonate resin but also olefin, acrylic, epoxy, polystyrene, polyethylene, polypropylene, silicone, fluorinated, ABS, and urethane resins.

In particular, polycarbonate and urethane resins are preferably used in light of processability and moldability. On the surface of the substrate 10 in the information recording layer side, grooves, lands, pit rows, and the like are formed depending on application.

The cover layer 30 may be made of any materials but required to be a transmissive material to transmit the laser beam Z as described above. As an example, an acrylic UV-curable resin is preferably used. In the optical recording medium 1, the cover layer 30 is designed to have a thickness of 98 μm, and the hard coating layer 35 is designed to have a thickness of 2 μm. The distance between the light incident surface 35A and the information recording layer 20 is, therefore, approximately 100 μm. The optical recording medium 1 conforms to the current Blu-ray disc standard, except for its storage capacity (25 GB at present).

The information recording layer 20, which is a layer in which data is stored, allows the user to write data. As types of data storage, there are write-once type, which does not allow the user to write data in an area where data has already been written, and rewritable type, which allows the user to erase the data which has already been written in the area and to rewrite data therein. In this embodiment, the rewritable type is taken as an example.

Figure 3:
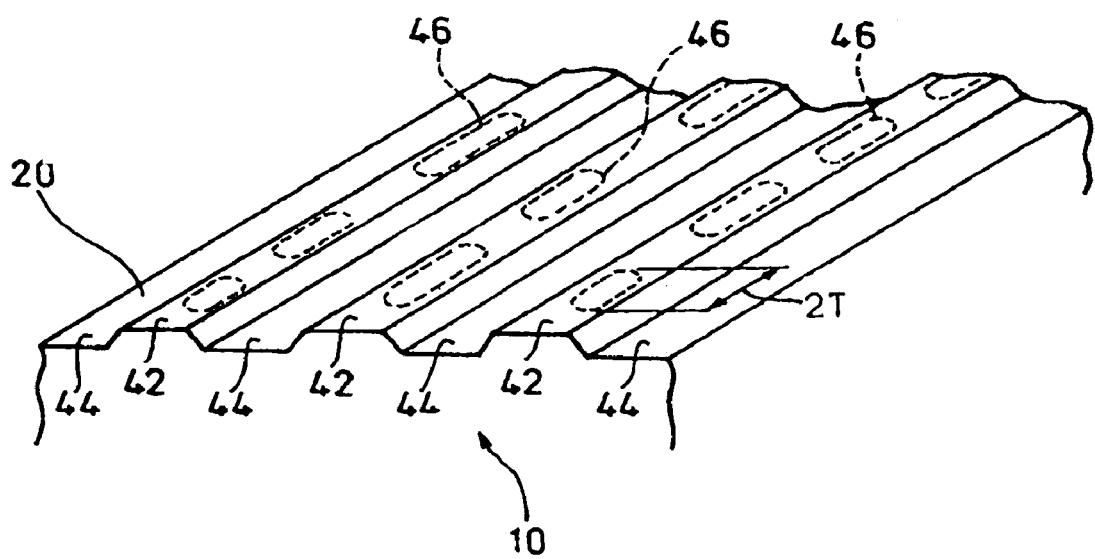
FIG. 3 is an enlarged perspective view showing data storage mode in the information recording layer of the optical recording medium.

As shown in FIG. 3, a spiral groove 42 (and land 44) are formed on the surface of the substrate 10, and the information recording layer 20 includes the groove 42. A recording film, which allows recording marks 46 to be formed thereon by the energy of the laser beam Z, is formed on the information recording layer 20. The groove 42 serves as a guide track for the laser beam Z during data recording. The recording marks 46 are formed on the information recording layer 20 in such a manner that the energy level (power) of the laser beam Z is modulated while the laser beam Z is moved along the groove 42. Since the type of data storage is the rewritable type here, the recording marks 46 are reversibly formed so as to allow erase and reformation. The case where the recording marks 46 are formed on the groove 42 is exemplified above, but the recording marks 46 may be formed on the land 44 or on both the groove 42 and the land 44.

The storage capacity of the information recording layer 20 depends on a combination of the size of the recording region (area) and the recording density. Since the recording region is physically limited, in the present embodiment, reducing the linear density of each recording mark 46, i.e., reducing the length of the unit recording mark 46 in the spiral direction increases the recording density, as shown in FIG. 3. Each of the length of the shortest recording mark (and the length of the shortest space) is set to a length corresponding to 2 T, where T is one clock cycle. Note that the length corresponding to 2 T means a distance the beam spot of the laser beam Z moves on the optical recording medium 1 for 2 T.

Figure 4:
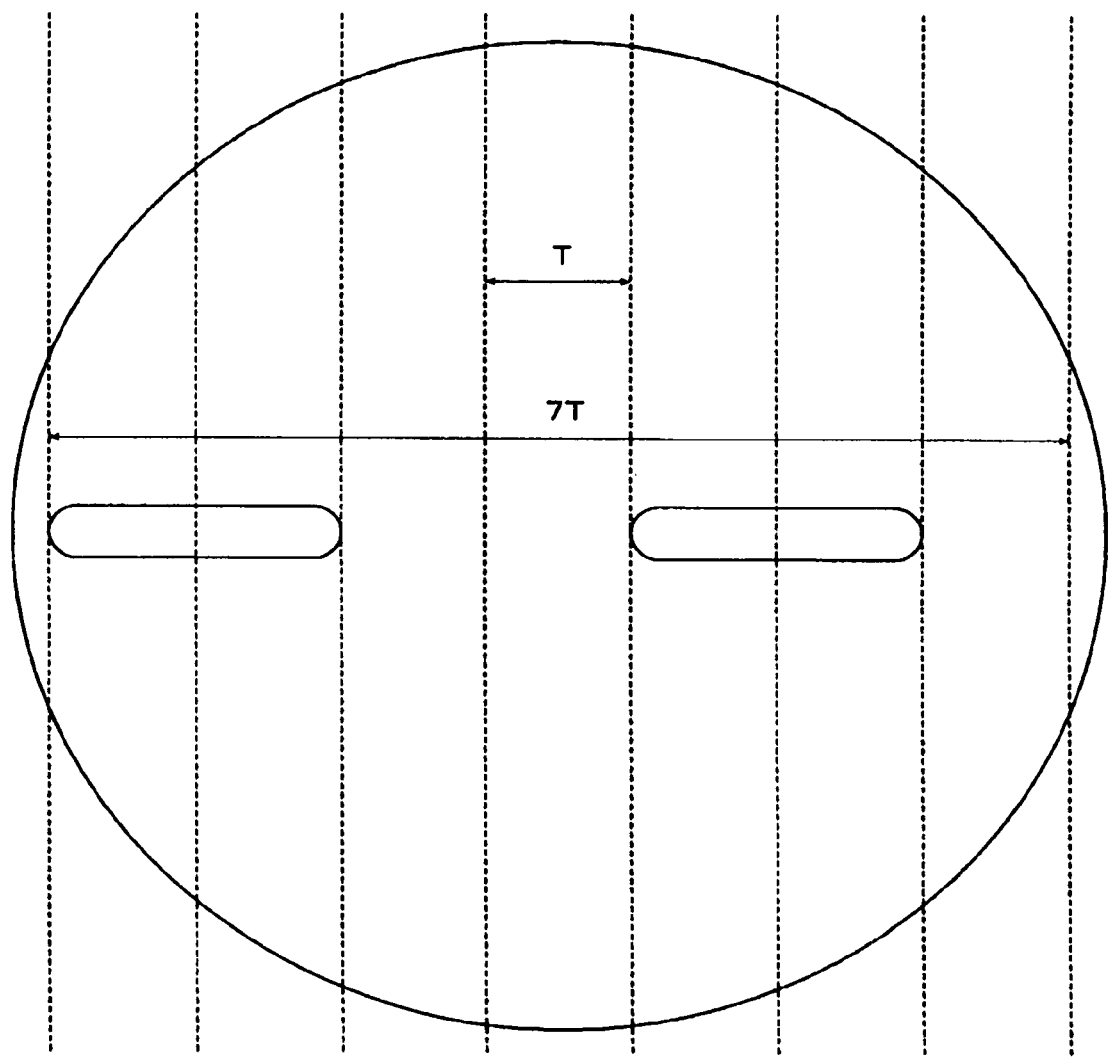
FIG. 4 is an enlarged view showing the beam spot of the recording reproduction apparatus.

Accordingly, reducing the clock cycle T reduces the length of the recording mark 46 in the spiral direction formed on the information recording layer 20 and thus increases the storage capacity. In the present embodiment, the length of the shortest mark 2 T is set to a value between 124.3 nm to 106.5 nm, and specifically to 111.9 nm. When the length of is the shortest mark 2 T is set to 124.3 nm, the information recording layer 20 allows recording 30 GB data thereon. When the length of the shortest mark 2 T is set to 106.5 nm, the information recording layer 20 allows recording 35 GB data thereon. As already mentioned, since the spot diameter of the laser beam Z is approximately 444 nm to 585 nm, at least a length corresponding to 7 T can fall within the beam spot, as shown in FIG. 4. Accordingly, if the minimum mark length corresponding to 2 T becomes considerably smaller than the beam spot diameter during recording, the irradiated area becomes large in comparison to the mark, thereby making the writing accuracy prone to deteriorate. The PRML (Partial Response Maximum Likelihood) detection scheme performed by the PRML processor 110 will be described below. This PRML detection scheme is to estimate binary data recorded on the information recording layer 20 based on an electrical analog signal detected by the light detection unit 108. In the PRML detection scheme, constraint length 5 PR (1, 2, 2, 2, 1) characteristic is applied as the reference class characteristic of the Partial Response (PR), which is suitable for the reproduction characteristics. The constraint length 5 PR (1, 2, 2, 2, 1) characteristic means that the read response to a sign bit of "1" constrains five bits and the waveform of the read response is represented by a bit sequence of "12221." It is therefore estimated that the read response to each sign bit actually recorded is formed by the convolution operation on the sequence "12221." For example, a response to a sign bit sequence of 00100000 is 00122210. Similarly, the response to a sign bit sequence of 00010000 is 00012221. Accordingly, the response to a sign bit sequence of 00110000 is 00134431 as a result of the convolution operation on the two responses. The response to a sign bit sequence of 001110000 is 001356531. Accordingly, in the convolution operation, the slice level for each bit is not determined, but it is required that the reproduction signal be decoded while taking a correlation between adjacent bits into consideration.

Note that it is assumed that the response obtained by the PR class characteristic is under ideal conditions. In that sense, the response is called an ideal response. Needless to say, since an actual responses contains noises, it does not match the ideal responses. Consequently, the actual response with noises and the like is compared with expected ideal responses, an ideal response in which a difference (distance) between the actual response and the ideal responses is the smallest is chosen, and the chosen ideal response is determined as a decoded signal. This manner is called the Maximum Likelihood (ML) detection. When a reproduction signal in which a sign bit of "1" is approximated to "12221" by reproduction is obtained, the PRML detection processing using the constraint length 5 PR (1, 2, 2, 2, 1) makes it possible to promote the reproduction sequence as follows: reproduction signal→ideal response "12221"→decoded signal "1".

The ML detection uses the Euclidean distance to calculate a difference between an ideal response and an actual response. For example, the Euclidean distance E between an actual response sequence A (=A0, A1, . . . , An) and an ideal response sequence B (=B0, B1, . . . , Bn) is defined as E=√{Σ(Ai−Bi)²}.

Accordingly, an actual response is compared with a plurality of expected ideal responses using the Euclidean distance to rank the expected ideal responses. An ideal response (maximum likelihood response) with the smallest Euclidean distance is chosen, and the reproduction signal is decoded using the chosen ideal response.

The signal quality is evaluated in such a manner that data under the decode process of the PRML detection scheme in the PRML processor 110 is received, and an error rate or a sequenced amplitude margin (SAM) value is detected using the received data. In this instance, the SAM value is a difference between the Euclidean distance of the maximum likelihood ideal response and the Euclidean distance of the second ideal response as being the next rank. Accordingly, the quality of reproduction data can be determined either whether an evaluation result using an error rate or a SAM value satisfies predetermined criterion or whether an irrecoverable error occurs. Here, although error rates or SAM values are introduced as standard values, the present invention is not limited to these, and other methods may be used to determine the quality of the signal.

Figure 5:
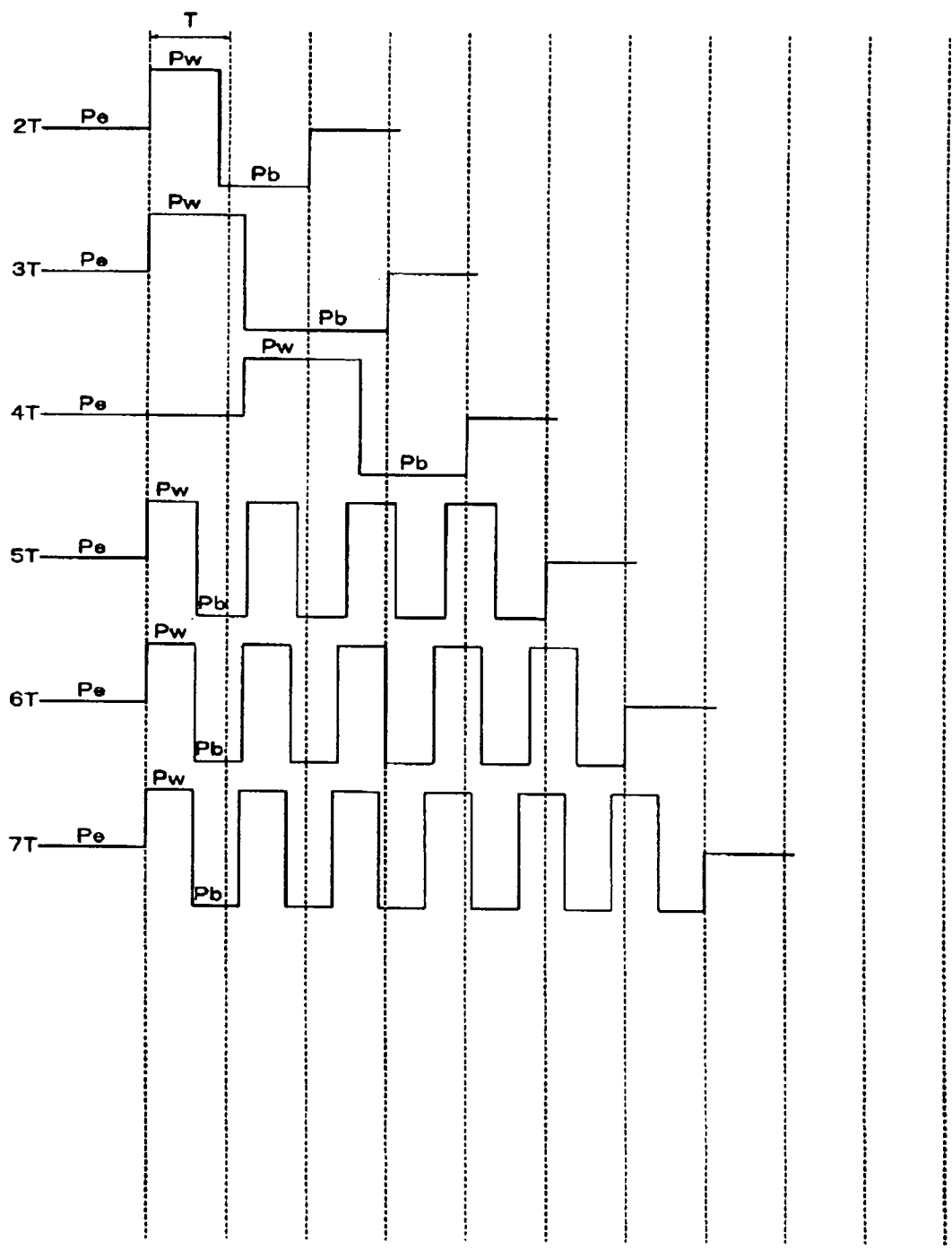
FIG. 5 is a timing chart showing a pulse waveform based on the write strategy conducted by the recording reproduction apparatus.

In the present embodiment, when the mark with a length of 5 T or more is recorded on the information recording layer 20, an n−1 write strategy is applied to the recording mark. The n−1 write strategy is a method for recording an nT mark with a length corresponding to nT (n is a natural number) using n−1 write pulses. For example, as shown in FIG. 5, the 5 T mark is recorded by four write pulse waveforms, a 6 T mark is recorded by five write pulse waveforms, and a 7 T mark is recorded by six write pulse waveforms. While these write pulses are set to a write power level Pw, a bias pulse with a bias power level Pb for cooling is applied for a period, except the write pulse period in a period for one recording mark. Furthermore, a laser beam with an erase power level Pe is applied for a period to a space other than the mark.

Furthermore, in the present embodiment, the 2 T, 3 T, and 4 T marks with a length that is less than 5 T are recorded by a single write pulse. These marks are considered to have a high probability for errors during reproduction in the PRML detection scheme, and by recording these marks using a single write pulse, the error rates can be reduced.

Figure 6:
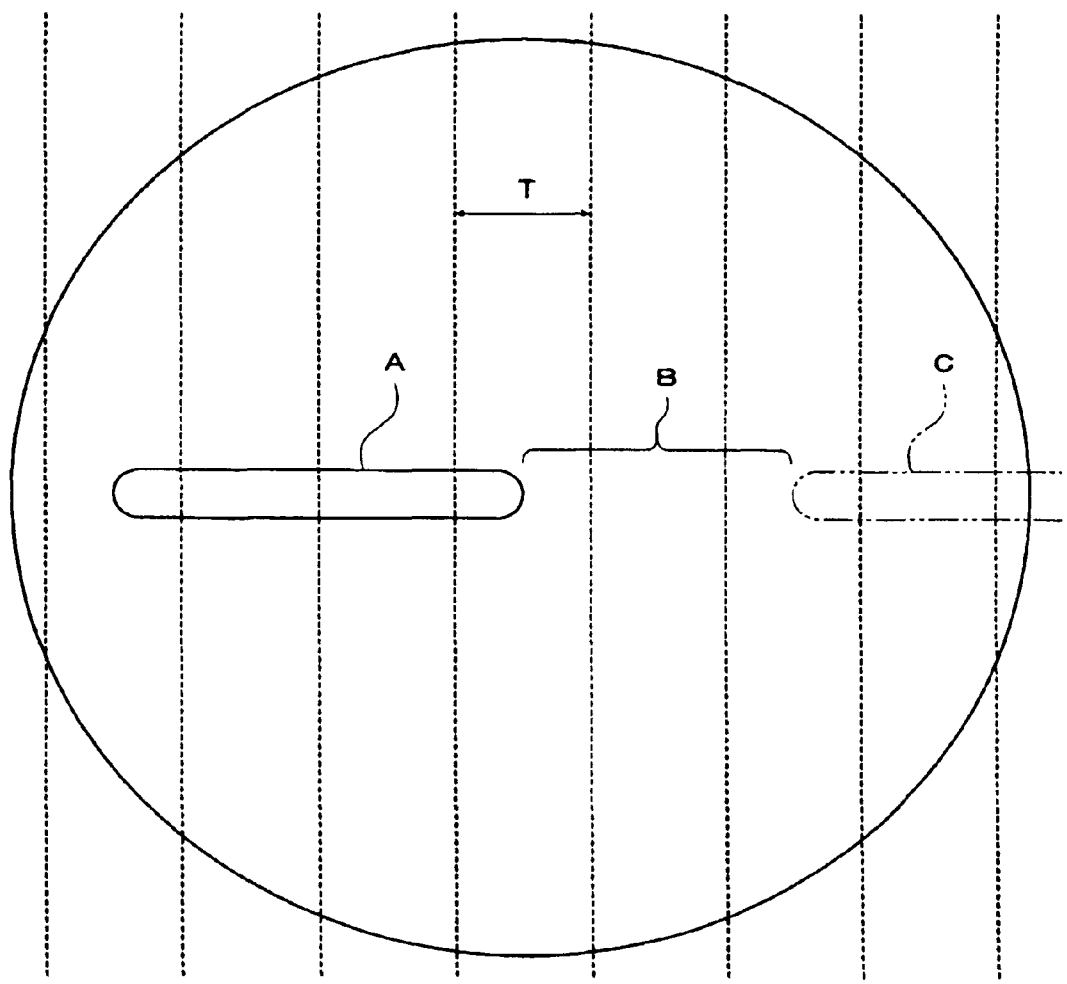
FIG. 6 is an enlarged view of a beam spot during recording.

As mentioned above, at least a length corresponding to 7 T can fall within a beam spot during recording. Therefore, when the 2 T, 3 T, and 4 T marks are recorded, there is at least an area corresponding to 5 T, 4 T, or 3 T except the mark to be recorded within an irradiation area of the beam spot. This means that the 2 T to 4 T marks are likely to be thermally affected by the irradiated pulses onto the adjacent spaces or the neighboring marks, or that the irradiated pulses onto the 2 T to 4 T marks are likely to thermally affect the adjacent spaces or the neighboring marks. For example, when a pattern of a 3 T mark A, a 2 T space B, and a 2 T mark C is to be recorded, as shown in FIG. 6, at the time when the writing of the first 3 T mark A has just been finished, the whole following 2 T space B and approximately half the 2 T mark C following thereafter are included within the beam spot, so that residual heat from the formation of 3 T mark A may affect and pre-heat the 2 T space B and the 2 T mark C. Therefore, writing the 3 T mark A using a single write pulse can prevent any excessive pre-heating effect on the following spaces and marks, thereby increasing the recording accuracy.

Figure 7:
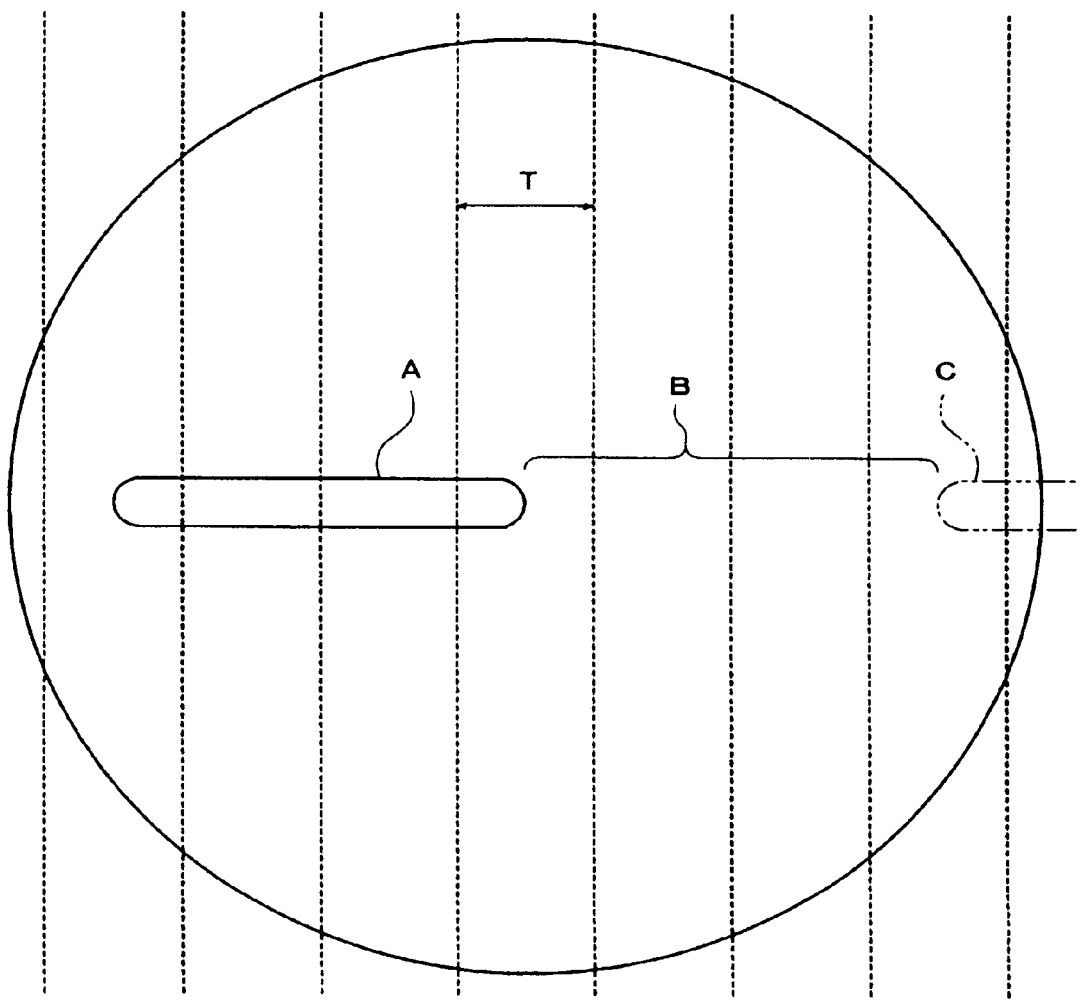
FIG. 7 is an enlarged view of a beam spot during recording.

Likewise, when a pattern of a 3 T mark A, a 3 T space B, and a 3 T mark C is to be recorded, as shown in FIG. 7, at the time when the writing of the first 3 T mark A has just been finished, the whole following 3 T space B and the lead region of the 3 T mark C following thereafter are included within the beam spot, so that residual heat from the formation of the 3 T mark A may affect and pre-heat the 3 T space B and the 3 T mark C. Therefore, by recording the 3 T mark C not by a plurality of write pulses but by a single write pulse, the recording operation can be achieved while taking the effect of residual heat into consideration, thereby increasing recording accuracy. In particular, since the 3 T mark and the 4 T mark have a lesser area when compared to the marks with a greater length, they are easily affected by residual heat, and the recording accuracy may easily deteriorate even in the PRML detection scheme. Therefore, with respect to the 3 T and 4 T marks, a different write strategy is used in order to realize high density writing.

It should be appreciated that the present invention is not necessarily limited to the case where the 4 T mark is recorded by a single write pulse. However, in the case where a length corresponding to 8 T to 9 T falls within the diameter of the beam spot, it is preferable that a single write pulse be positively used for the 4 T mark because the 4 T mark also becomes as susceptible to heat as the aforementioned 3 T mark is.

Furthermore, in the present embodiment, the 2 T, 3 T, and 4 T marks may be recorded by a single write pulse only when a space immediately before the mark to be recorded is a 2 T or 3 T space, and, when a space immediately before the mark to be recorded is neither a 2 T nor 3 T space, they may be recorded under the n−1 write strategy, where a 2 T mark, a 3 T mark, and a 4 T mark are recorded by one write pulse, two write pulses, and three write pulses, respectively. As described with reference to FIGS. 6 and 7, when a length corresponding to 7 T is included within a beam spot, the smaller the length of the space is, the more likely the thermal effect between marks becomes. Furthermore, since the PRML detection scheme requires that bit rows be subjected to a convolution computation, the quality of reproduced signals depends not only on the length of each recording mark but also on a set of a writing mark and a space. Accordingly, the probability of reproduction errors is high when short spaces and short recording marks appear in series. Accordingly, in order to reduce the error rate, recording with a single write pulse is selectively applied while taking into consideration the length of the space immediately before the mark to be recorded.

Figure 8:
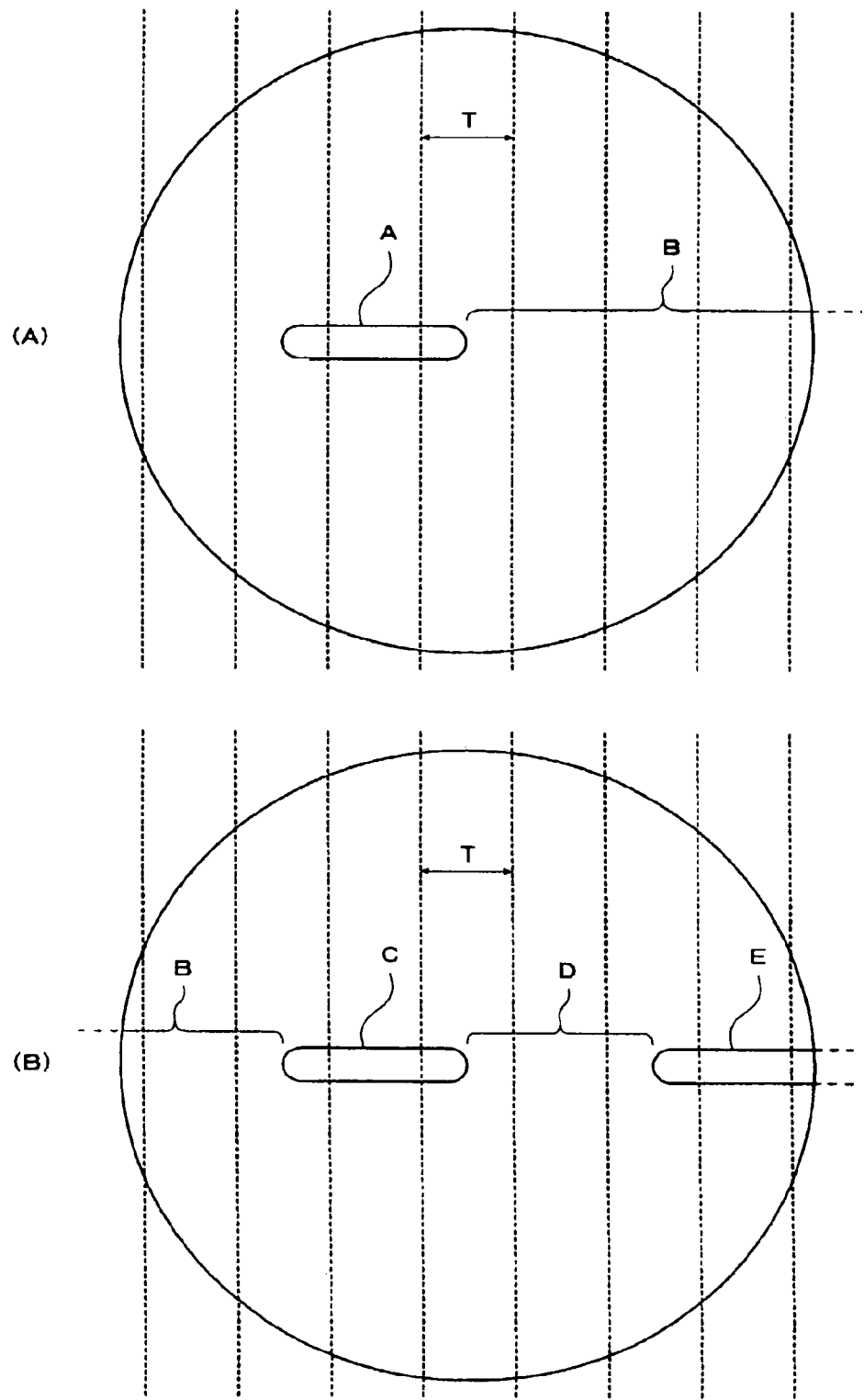
FIGS. 8A and 8B are enlarged views of a beam spot during recording.

For example, consider a case where a pattern of a 2 T mark A, a 5 T space B, a 3 T mark C, a 2 T space D, and a 3 T mark E is to be recorded. In this case, when the first 2 T mark A is being written, the following 3 T mark C has not fallen within the beam spot because of the 5 T space B, as shown in FIG. 8A. Hence, this 3 T mark C may be recorded by two write pulses. Conversely, when the 3 T mark C is being recorded, the front end region of the following 3 T mark E has fallen within the beam spot because of the adjacent 2 T space D as shown in FIG. 8B. Hence, in contrast to the previous 3 T mark C, this 3 T mark E is recorded by irradiating with a single write pulse. Accordingly, when the 3 T mark E is being recorded, the excessive heating because of the residual heat from the 3 T mark C can be prevented. Furthermore, the reheating on the end region of the preceding 3 T mark C because of the heat for recording the 3 T mark E, which would result in the re-crystallization thereof, can also be prevented.

As can be seen from the above-detailed description, when a space immediately before a mark to be recorded is of the shortest length (being 2 T in the present example), thermal effects due to marks that come on both sides of the space become particularly large, and it is preferable that a single write pulse be applied.

Figure 9:
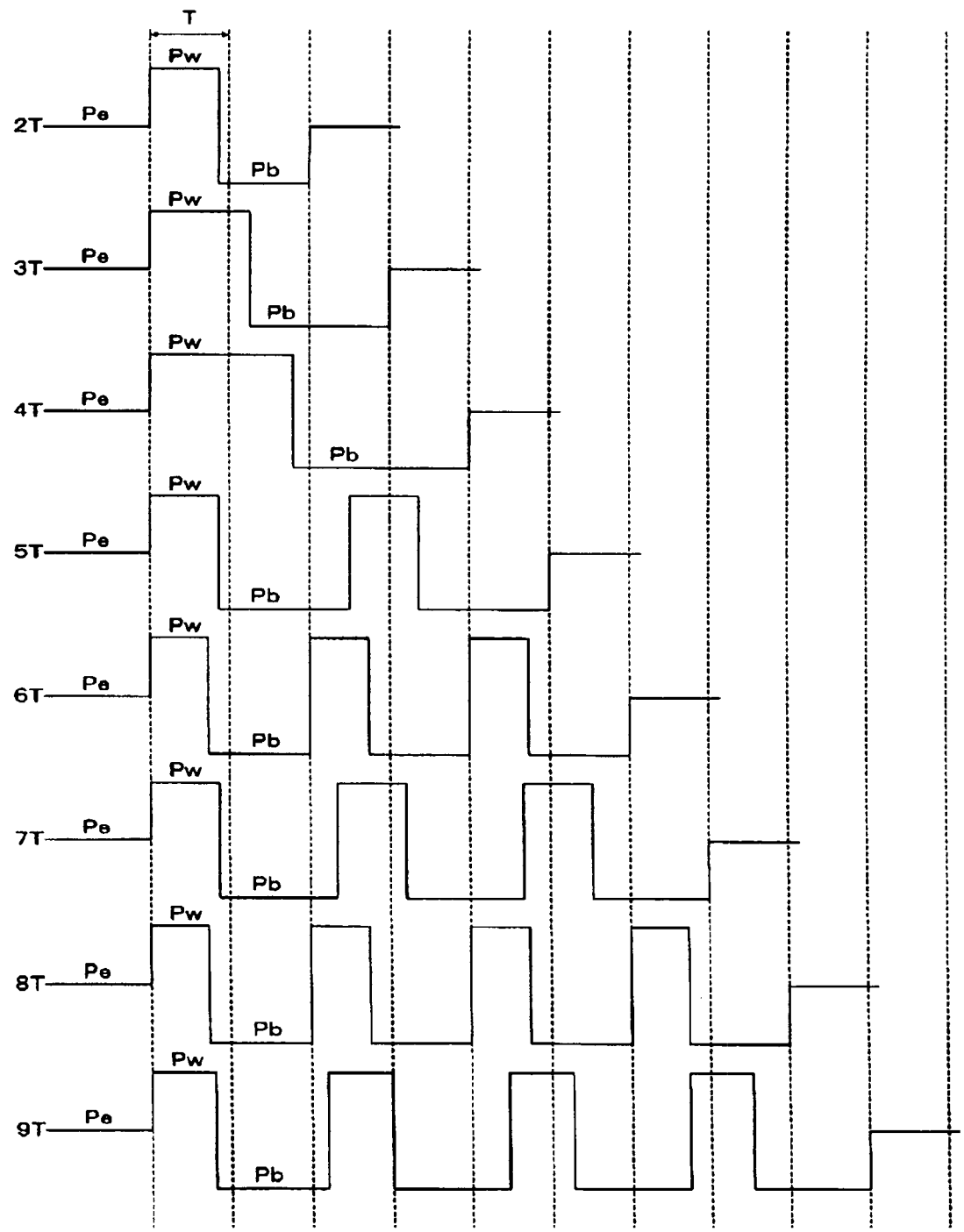
FIG. 9 is a timing chart showing a pulse waveform based on a write strategy of a second embodiment.

An optical recording method according to a second embodiment will now be described. The recording reproduction apparatus used in this optical recording method is the same as that of the first embodiment, and therefore a further explanation and illustration of such will not be provided. In the optical recording method according to the second embodiment, marks with a length corresponding to 5 T or more are recorded using an n/2 write strategy. The n/2 write strategy is a method for recording an nT mark with a length corresponding to nT (n is a natural number) using m=n/2 write pulses (m is an integer and rounded down to the left of the decimal point). For example, as shown in FIG. 9, the 5 T mark is recorded by two write pulse waveforms (a start write pulse and an end write pulse), the 6 T and 7 T marks are recorded by three write pulse waveforms (a start write pulse, a middle write pulse, and an end write pulse), and the 8 T and 9 T marks are recorded by four write pulse waveforms.

Furthermore, in the second embodiment, marks with a length corresponding to less than 5 T such as 2 T, 3 T, or 4 T are recorded by a single write pulse. In particular, the 4 T mark, which is usually recorded by two write pulses, is recorded by a single write pulse. As a result, error rates can be reduced for marks that are considered to have a high probability for errors during reproduction in the PRML detection scheme as already described in the first embodiment.

Figure 10:
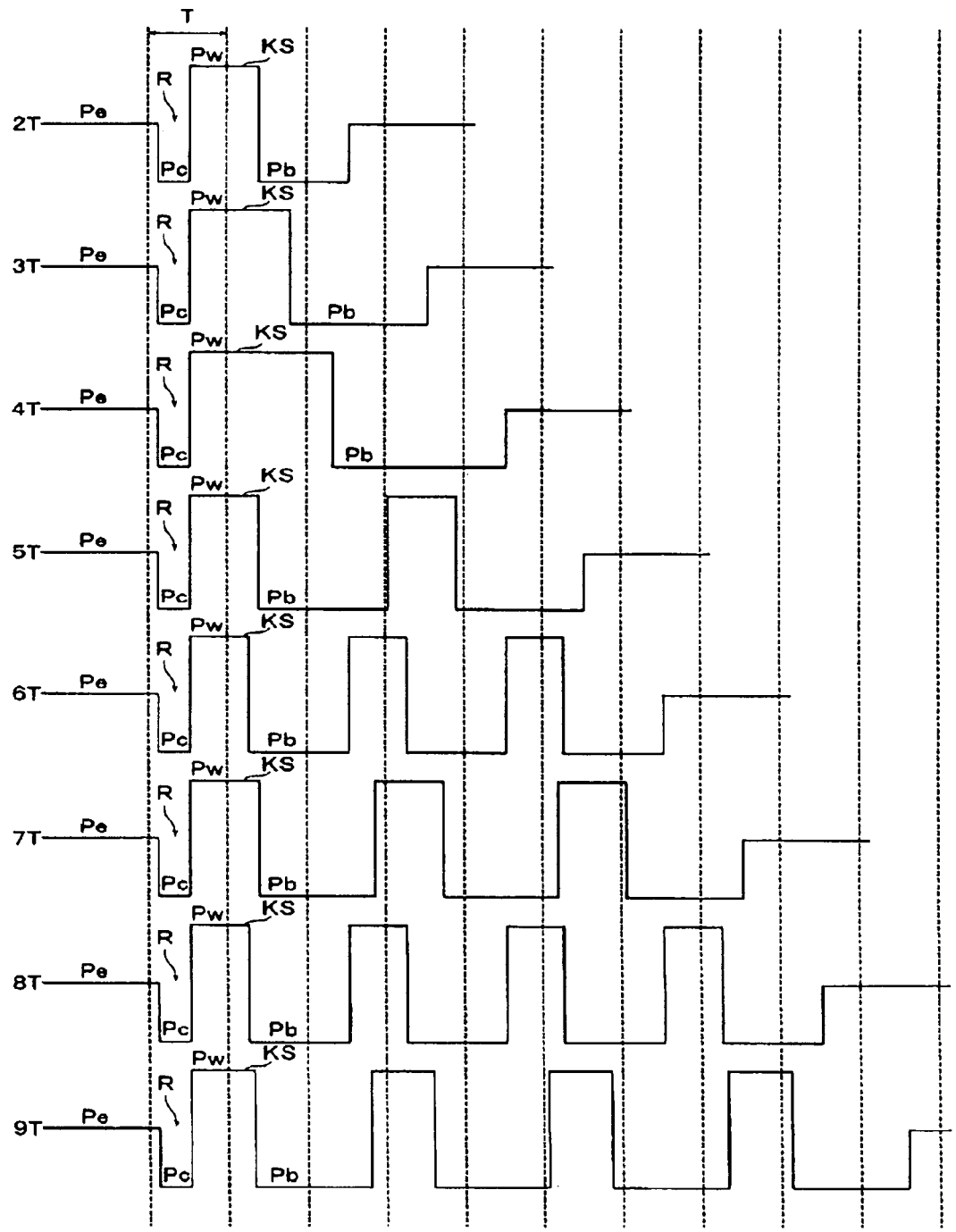
FIG. 10 is a timing chart showing a pulse waveform based on a write strategy of a third embodiment.

An optical recording method according to a third embodiment will now be described below. The recording reproduction apparatus used in this optical recording method is the same as that of the first embodiment, and therefore a further explanation and illustration of such will not be provided. In the optical recording method according to the third embodiment, as shown in FIG. 10, a cooling pulse R is inserted immediately before a front end write pulse KS that initiates the formation of each mark. The cooling power level Pc of the cooling pulse R is set to a value less than the erase power level Pe. In this instance, it is set to the same value as the bias power level Pb. The n/2 write strategy is used for marks with a length corresponding to 4 T or more, and a single write pulse is used for marks with a length corresponding to less than 4 T such as 2 T or 3 T.

Figure 11:
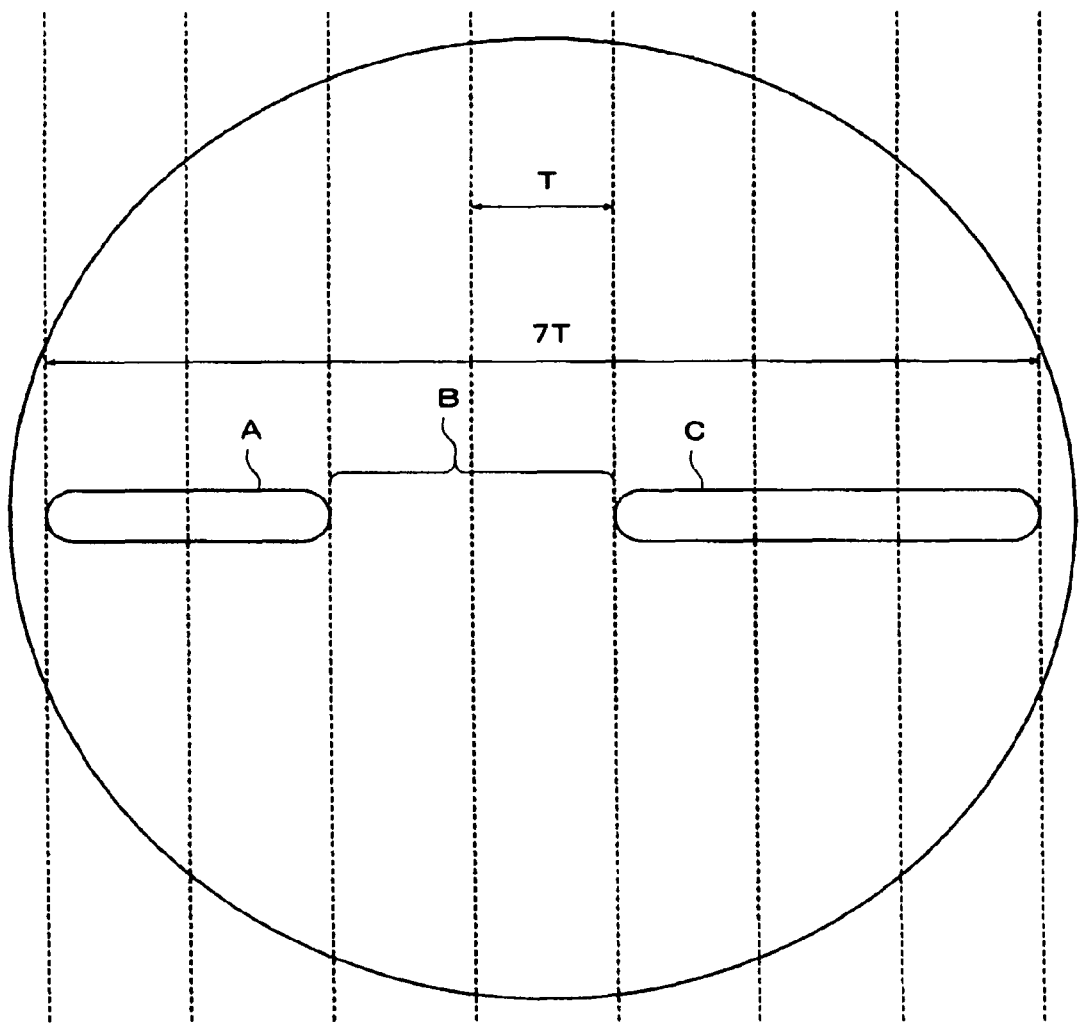
FIG. 11 is an enlarged view of a beam spot during recording.

According to the optical recording method of the third embodiment, since the cooling pulse R is inserted immediately before the write pulse KS at the front end side that initiates the writing of the mark, even if a region corresponding to 7 T or more is included within a beam spot, heat due to the laser beam having the erase power level Pe irradiated onto the space immediately before the mark to be recorded can be prevented from affecting the mark. Furthermore, as shown in FIG. 11, when a pattern of a 2 T mark A, a 2 T space B, and a 3 T mark C is to be recorded, there is a possibility of preheating the lead end of the 3 T mark C when the 2 T mark A is being recorded or the 2 T space B is being erased. However, since the cooling pulse R can cool such regions having a possibility of being preheated, recording accuracy can be improved.

Although the third embodiment illustrates the case where the cooling pulse R is always inserted immediately before the front end write pulse KS, it should be appreciated that the present invention is not limited to such an embodiment. For example, it is possible to selectively use a recording method with the cooling pulses of the third embodiment being inserted along with a recording method without any cooling pulses being inserted. Specifically, when the write speed is slow (1×), the write strategy with cooling pulses illustrated in the third embodiment being inserted may be adopted, and when the write speed is fast (2×), a regular write strategy with no cooling pulses being inserted may be adopted.

In the case where the write speed is low, the irradiation time onto the information recording layer 20 becomes long and excessive heating may easily result. However, by inserting cooling pulses, the heat radiation effect can be enhanced. Conversely, in the case where the write speed is fast, by not inserting any cooling pulses, sufficient heating can be conducted. In other words, by selectively adopting the recording method of the third embodiment, a plurality of write speeds can be accommodated. Other than in cases where the recording method of the third embodiment is selectively adopted, the recording methods of the first and second embodiments may selectively be adopted depending on the variation of the write speeds used.

The reproduction of data from an optical recording medium 1 that was subjected to an optical recording method illustrated in the above-described first, second, and third embodiments will be described. In this instance, the reproduction of data from the optical recording medium 1 of FIGS. 2A and 2B illustrated in the first embodiment will be described as an example.

Figure 12:
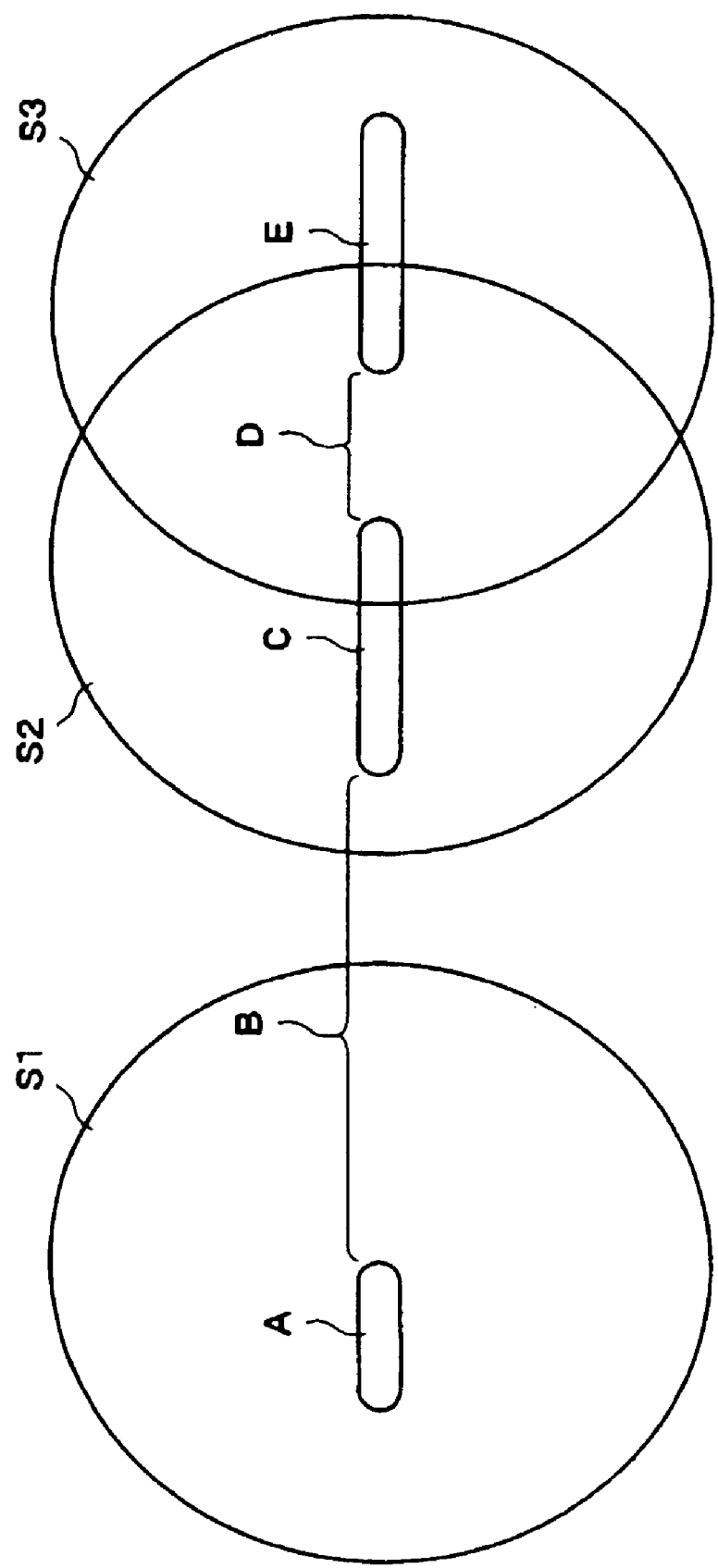
FIG. 12 is an enlarged view of a beam spot during reproduction of the optical recording medium of the present invention.

As shown in FIG. 12, the optical recording medium 1 has a pattern of a 2 T mark A, a 5 T space B, a 3 T mark C, a 2 T space D, and a 3 T mark E recorded thereon. Furthermore, the 3 T mark C has been recorded by two write pulses, but the 3 T mark E has been recorded by a single write pulse.

When the first 2 T mark A is being reproduced, the center of the reproduction beam spot S1 passes over the 2 T mark A. When this happens, since the diameter of the reproduction beam spot S1 corresponds to 7 T, other marks do not enter the beam spot S1 and the quality of a reproduction signal is stable. Conversely, when the next 3 T mark C is being reproduced, while the center of the reproduction beam spot S2 is still passing over the 3 T mark C, the next 3 T mark E enters the reproduction beam spot S2. Therefore, because of the existence of the following 3 T mark E, it is likely that the quality of the reproduction signal of the 3 T mark C may deteriorate. However, in the present embodiment, since the following 3 T mark E has been recorded by a single pulse, it is possible to reduce the effect of the reproduction beam spot 52 on the reflected light, thereby controlling the deterioration of the reproduction quality of the 3 T mark C.

Similarly, when reproducing the 3 T mark E using the reproduction beam spot S3, since the back end portion of the 3 T mark C remains within the beam spot S3, it is likely that the quality of the reproduction signal may deteriorate. However, as already described, since the 3 T mark E itself has been recorded by a single pulse, the reproduction signal is still stable even if it is affected by the preceding 3 T mark C. In other words, in the case where the diameter of the reproduction beam spot corresponds to 7 T or more, i.e., the radius corresponds to 3.5 T or more, even if a 2 T or 3 T space is present between two adjacent recording marks, one of the recording marks is within the reproduction beam spot when the other recording mark is being reproduced. In particular, in the case where a recording mark is as small as corresponding to 2 T to 4 T, another recording mark enters the reproduction beam spot while almost the entire length of the recording mark is within the same reproduction beam spot. This greatly affects the quality of reproduction signals, thereby resulting in reproduction errors.

According to the present invention, effects exchanged between adjacent recording marks in the conditions described above are predicted in advance, and recording is conducted with a single pulse, thereby enhancing the reproduction quality.

Example 1 and Comparative Example 1

An optical recording medium compatible with 2× write speed was used on the recording reproduction apparatus 100 of the present embodiment and the storage capacity of 30 GB was achieved, where the clock cycle T was 15.15 nsec, the write speed was 4.1 m/sec, and the length corresponding to 1 T was 62 nm. A random pattern bit array was recorded in the optical recording medium. To evaluate its recording accuracy, the reproduction quality of the recording pattern was evaluated using the Partial Response Signal to Noise Ratio (PRSNR) and the Simulated bit Error Rate (SbER). The PRSNR is an evaluation method which can simultaneously provide a signal to noise ratio of a reproduction signal, and the linearity of an actual reproduction signal and an ideal response, and the greater its value, the better the signal quality. In this instance, a PRSNR measurement board manufactured by Pulstec Industrial Co., Ltd. was used for the evaluation. The SbER is a method in which SAM values for a plurality of reproduction signals are calculated, and an occurrence rate of read errors is evaluated based on the average and the standard deviation of the normal distribution obtained from the SAM values, and the less its value, the better the signal quality. In this instance, an SbER measurement unit manufactured by Pulstec Industrial Co., Ltd. was used.

With a write strategy, 2 T marks were recorded using a single write pulse, 3 T marks were recorded using a combination of a cooling pulse and a single write pulse, and 4 T marks or more were recorded using the typical n−1 write strategy. For reference purposes, a pulse waveform of a 3 T mark is shown in FIG. 13A. When the 3 T mark was recorded, a single write pulse K was adopted and a cooling pulse R was inserted immediately before the write pulse. The following bias pulse B was extended backward from the end of the 3 T mark to be formed so that the cooling time was as long as possible. This avoided poor cooling.

As Comparative example 1, a normal n−1 write strategy was used for recording all random patterns, and the quality of the reproduction signal was evaluated. As shown in FIG. 13B, the pulse waveform for the 3 T mark in Comparative example 1 consisted of two write pulses K1 and K2 and two bias pulses B1 and B2. The verification was performed so that the results were as highly accurate as possible by varying the pulse width of the write pulse K1 at the start side, and the results were compared with Example 1.

FIG. 14 shows values of the best quality PRSNR and SbER obtained by Comparative example 1 and a value of the quality obtained by Example 1. As can be seen from the results in FIG. 14, with SbER, while the best quality (being the minimum value) obtained by Comparative example 1 was 3.4E-06, the quality obtained by Example 1 was 5.5E-07, which is less than that of Comparative example 1. As a result, it was found that Example 1 was superior to Comparative example 1 with respect to signal quality. With PRSNR, while the best value obtained by Comparative example 1 was 15.8, the best value obtained by Example 1 was 16.8. Similarly, it was found that Example 1 was superior to Comparative example 1 with respect to signal quality. Accordingly, it was found that the recording accuracy obtained by Example 1 was better given the results of both the SbER and PRSNR.

Comparative Example 2

As Comparative example 2, another recording experiment for a random pattern was conducted, where the length corresponding to 1 T and the spot diameter were set to 74.5 nm and 476.5 nm, respectively, such that the spot diameter was corresponding to less than 7 T, namely, approximately 6.4 T. The storage capacity was set at 25 GB. As a write strategy, the write strategy corresponding to that used in Example 1 and a write strategy corresponding to that used in Comparative example 1 were used. The results are shown in FIG. 15. With SbER, while the best quality (the minimum value) of the recording data obtained by the write strategy corresponding to that in Comparative example 1 was 4.6E-08, the quality obtained by the write strategy corresponding to that in Example 1 was 3.9E-08. As a result, the signal quality in Example 1 was a little bit better. With PRSNR, while the best quality (the maximum value) corresponding to that in Comparative example 1 was 23.0, the quality corresponding to that in Example 1 was 22.3. As a result, the write strategy corresponding to that in Comparative example 1 was definitely better in signal quality. As a result, it turns out that the write strategy corresponding to Example 1 is not necessarily preferable when the spot diameter is smaller than that corresponding to 7 T as in Comparative example 2.

As described above, the present embodiments are described for the case where the information recording layer in the optical recording medium is a single layer, however, the present invention is not limited thereto, and is also applicable to multilayer structure. In such a case, the recording method according to the present invention is preferably applied selectively to each information recording layer in a multilayer structure. Specifically, it is preferable that the recording method according to the present invention be used for the recording layer close to the laser beam, and another recording method be used for a recording layer located further away from the laser beam because the recording layer exhibits high heat radiation.

It should be appreciated by one skilled in the art that the recording method according to the present invention is not limited to the above-detailed embodiments, and various modifications may be made thereto without departing from the scope thereof.

According to the present invention, the best recording conditions can be set even if the storage capacity or the recording density is increased, thereby increasing the recording accuracy.

The entire disclosure of Japanese Patent Application No. 2006-203018 filed on Jul. 26, 2006 including specification, claims, drawings, and summary are incorporated herein by reference in its entirety.

What is claimed is:

1. An optical information recording method for recording information on an optical recording medium by irradiation of a write pulse of a laser beam, the method comprising the step of:

setting a spot diameter $\lambda/NA$ of the laser beam to be equal to or bigger than 7 T mark where T is one recording clock cycle, $\lambda$ is a wavelength of the laser beam, and NA is a numerical aperture of an objective lens; and recording a specified mark of a length corresponding to 2 T, 3 T and 4 T by a single write pulse, a mark of a length corresponding to 5 T by less than 3 pulses, and a mark of a length corresponding to 6 T or greater by three or more pulses of the laser beam.

2. The optical information recording method according to claim 1, wherein the specified mark has a length corresponding to 3 T or 4 T.

3. The optical information recording method according to claim 1, wherein the specified mark is recorded by a single write pulse when a space immediately before the specified mark has a specified length, and the specified mark is recorded by a plurality of write pulses when the space immediately before the specified mark has a length other than the specified length.

4. The optical information recording method according to claim 1, wherein the specified mark is recorded by a single write pulse when a space immediately before the specified mark has a specified length, the specified mark is recorded by a plurality of write pulses when the space immediately before the specified mark has a length other than the specified length, and the specified length of the space immediately before the specified mark includes a minimum length among those which the space can have.

5. The optical information recording method according to claim 1, comprising, when recording an nT mark with a length corresponding to nT (n is a natural number), recording a mark with a length corresponding to 5 T or greater by write pulses according to an n/2 write strategy using m=n/2 write pulses, m is an integer and rounded down to the left of the decimal point.

6. The optical information recording method according to claim 1, wherein the information recorded on the optical recording medium is erased by irradiation of the laser beam with an erase power level lower than that of the write pulse, and wherein a cooling pulse with a power level lower than the erase power level is inserted immediately before the write pulse that initiates the formation of the mark.

7. The optical information recording method according to claim 1, wherein the wavelength $\lambda$ of the laser beam is set to a value between 400 to 410 nm, and the numeral aperture NA is set to a value between 0.7 to 0.9.

8. The optical information recording method according to claim 1, wherein a shortest mark of all the marks is 125 nm or less.

9. An optical information recording method for recording information on an optical recording medium by irradiation of a write pulse of a laser beam and for erasing information recorded on the optical recording medium by irradiation of the laser beam with an erase power level lower than that of the write pulse, the method comprising:

setting a spot diameter $\lambda/NA$ of the laser beam to be equal to or bigger than 7 T mark where T is one recording clock cycle, $\lambda$ is a wavelength of the laser beam, and NA is a numerical aperture of an objective lens; and recording a specified mark of a length corresponding to 4 T or less by a single write pulse, a mark of a length corresponding to 5 T by less than 3 pulses, and a mark of a length corresponding to 6 T or greater by three or more pulses of the laser beam, and inserting a cooling pulse, with a power level lower than an erase power level, immediately before the write pulse that initiates the formation of the mark.

10. The optical information recording method according to claim 9, wherein the wavelength of the laser beam is set a value between 400 to 410 nm, and the numeral aperture NA is set to a value between 0.7 to 0.9.

11. The optical information recording method according to claim 9, wherein a shortest mark of all the marks is 125 nm or less.

12. An optical recording apparatus, comprising:
a laser beam source for generating a laser beam;
an objective lens for condensing the laser beam; and
irradiation controller for irradiating an optical recording medium with a write pulse of the laser beam to record information, wherein
the apparatus is configured by setting a spot diameter $\lambda$/NA of the laser beam to be equal to or bigger than 7 T mark where T is one recording clock cycle, $\lambda$ is a wavelength of the laser beam, and NA is a numerical aperture of an objective lens; and
the irradiation controller irradiates a single write pulse onto the optical recording medium to form a specified mark of a length corresponding to 4 T or less, less than 3 pulses onto the optical recording medium to form a specified mark of a length corresponding to 5 T, and three or more pulses onto the optical recording medium to form a specified mark of a length corresponding to 6 T or greater.

13. An optical recording apparatus, comprising:
a laser beam source for generating a laser beam;
an objective lens for condensing the laser beam; and
irradiation controller for irradiating an optical recording medium with a write pulse of the laser beam to record information and erasing information recorded on the optical recording medium by irradiation of the laser beam with an erase power level lower than that of the write pulse, wherein
the apparatus is configured by setting a spot diameter $\lambda$/NA of the laser beam to be equal to or bigger than 7 T mark where T is one recording clock cycle, $\lambda$ is a wavelength of the laser beam, and NA is a numerical aperture of an objective lens;
the irradiation controller irradiates a single write pulse onto the optical recording medium to form a specified mark of a length corresponding to 4 T or less, less than 3 pulses onto the optical recording medium to form a specified mark of a length corresponding to 5 T, and three or more pulses onto the optical recording medium to form a specified mark of a length corresponding to 6 T or greater; and
the irradiation controller inserts a cooling pulse, with a power level lower than the erase power level, immediately before the write pulse that initiates the formation of the mark.

* * * * *